(12) United States Patent
Smith et al.

(10) Patent No.: US 11,543,068 B2
(45) Date of Patent: Jan. 3, 2023

(54) LEVELING FOOT INSTALLATION TOOL

(71) Applicant: INTELLIGRATED HEADQUARTERS, LLC, Mason, OH (US)

(72) Inventors: Jared Smith, Rosedale, MD (US); Clifford Pfeiffer, Littlestown, PA (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/168,358

(22) Filed: Feb. 5, 2021

(65) Prior Publication Data
US 2022/0252207 A1 Aug. 11, 2022

(51) Int. Cl.
| | |
|---|---|
| *F16M 11/24* | (2006.01) |
| *A47B 91/02* | (2006.01) |
| *F16M 7/00* | (2006.01) |
| *A47B 91/00* | (2006.01) |

(52) U.S. Cl.
CPC .............. *F16M 7/00* (2013.01); *A47B 91/00* (2013.01); *A47B 91/024* (2013.01); *F16M 2200/08* (2013.01)

(58) Field of Classification Search
CPC .... F16M 7/00; F16M 2200/08; A47B 91/024; B65D 25/24
See application file for complete search history.

(56) References Cited

U.S. PATENT DOCUMENTS

| | | | | |
|---|---|---|---|---|
| 3,592,423 A | * | 7/1971 | Mui | F16F 1/3615 248/188.4 |
| 3,778,957 A | * | 12/1973 | Appleberry | F16B 5/0233 52/22 |
| 5,333,423 A | * | 8/1994 | Propst | E04F 15/02476 248/188 |
| 7,780,128 B2 | * | 8/2010 | Walsberg | A47B 91/024 248/188.4 |

(Continued)

FOREIGN PATENT DOCUMENTS

CN 210415190 U 4/2020

OTHER PUBLICATIONS

AV Products, Inc. Leveling Foot Installation and Cleaning Guide: How to Install Leveling Feet. Retrieved from https://www.avproductsinc.com/machine-leveling/installation-cleaning.html.

(Continued)

*Primary Examiner* — Tan Le
(74) *Attorney, Agent, or Firm* — Alston & Bird LLP (57) ABSTRACT

Various embodiments illustrated herein disclose a leveling foot tool which comprises a first base and a threaded rod. The threaded rod comprises a cavity to insert a screw nut and bolt assembly. A socket driver is installed over the screw nut and bolt assembly. The leveling foot tool is mounted on a drill. The first base of the leveling foot tool has one or more holes through which one or more screw nut and bolt assemblies are threaded. A leveling foot, which is to be installed comprises a second base and a threaded rod. The second base of the leveling foot comprises one or more holes to receive the one or more screw assemblies of the leveling foot tool. Using the rotational and the translational motion of the drill, the threaded rod of the leveling foot is drilled into a threaded hole of a leg of a machine.

20 Claims, 6 Drawing Sheets

(56) References Cited

U.S. PATENT DOCUMENTS

| | | | | |
|---|---|---|---|---|
| 8,201,381 B2* | 6/2012 | Heath | .................... | E04B 5/40 |
| | | | | 52/704 |
| 2006/0266896 A1* | 11/2006 | Balistreri | ............. | A47B 91/024 |
| | | | | 248/188.4 |
| 2014/0263885 A1* | 9/2014 | Oltman | ................. | B65D 19/18 |
| | | | | 248/188.8 |

OTHER PUBLICATIONS

Good Times. 100mm Modular Decking Adjustable Support Foot (Model No. GRDFOOT1). Retrieved from https://www.bunnings.com.au/good-times-100mm-modular-decking-adjustable-support-foot_p8451185.

Wilson & Bradley. Stan the Stand Extension Legs—Pair (Model No. PPSTSE). Retrieved from https://www.bunnings.com.au/stan-the-stand-extension-legs-pair_p2660828.

* cited by examiner

LEVELING FOOT INSTALLATION TOOL

TECHNICAL FIELD

Example embodiments of the present disclosure relate generally to leveling feet and, more particularly, to a leveling foot tool that can be used to drill leveling feet into legs of machines which are to be placed on uneven floors.

BACKGROUND

Machines which are placed on irregular floors are generally positioned using leveling feet to counteract the unsteady movement of one or more support legs of the machines being placed on such floors. In some cases, the machines themselves have unequal support legs. The leveling feet, which are fastened to the ends of the support legs provide a uniform surface on which to operate the machine.

The leveling feet are installed by inserting each of the leveling feet into a threaded hole positioned at a lower end of each of the legs of a machine. This process is carried out manually by an operator, by screwing in each of the leveling feet into the threaded hole in each of the legs of the machine until a desired height of the leveling feet is obtained.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION OF THE INVENTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

Various embodiments disclosed herein provide for a leveling foot tool. The leveling foot tool can comprise a firstbase and a threaded rod. The first base and the threaded rod can be rotatable with respect to each other. Further, the threaded rod can comprise a cavity. A screw nut and bolt assembly can be threaded into the cavity of the threaded rod. A socket driver can be installed over the screw nut and bolt assembly in such a manner that the socket driver is held in place over the screw nut and bolt assembly. Further, the first base of the leveling foot tool can have one or more holes to receive one or more screw nut and bolt assemblies. The leveling foot tool and socket driver can be engaged by a drill chuck and rotated by a drill.

The leveling foot which is to be installed using the leveling foot tool can comprise a threaded rod and a second base. The leveling foot can be installed in a leg of a machine by means of a threaded hole in a lower end of the leg of the machine, wherein the threaded hole can receive the threaded rod of the leveling foot. The second base of the leveling foot can further comprise one or more holes to engage the one or more screw nut and bolt assemblies of the leveling foot tool, such that the first base of the leveling foot tool and the second base of the leveling foot are connected to each other.

The first base of the leveling foot tool can be rotated using the drill. In response to the rotation of the first base of the leveling foot tool, the second base of the leveling foot which is connected to the first base, can be configured to rotate as well. The drill can configure rotational as well as translational movement of the second base of the leveling foot which is connected to the first base. The translational movement of the second base of the leveling foot can further cause the threaded rod of the leveling foot to be driven into the threaded hole in the leg of the machine. Using the leveling foot tool together with the drill eliminates the need to manually screw in the leveling foot and also reduces the time needed to install the leveling foot.

In an embodiment, the first base of the leveling foot tool and the threaded rod can be detachable from each other.

In an embodiment, the threaded rod can be a threaded stud comprising a threaded bolt and a hexagonal head. In other embodiments, the threaded rod can comprise a rod with a ball end that fits into a spherical depression in the foot base.

In an embodiment, shape of the first base of the leveling foot tool can be any geometrical shape.

In an embodiment, the screw nut and bolt assembly can include a hex nut and a hex bolt.

In an embodiment, the hex nut can be held in place over the hex bolt using one or more of a permanent thread locker, an industrial adhesive, and an epoxy.

In an embodiment, the screw nut and bolt assembly can be inserted into the cavity of the threaded rod and held in place using one or more of a permanent thread locker, an industrial adhesive, and an epoxy.

In an embodiment, the socket driver can be installed over the screw nut and bolt assembly using one or more of a permanent thread locker, an industrial adhesive, and an epoxy.

In another embodiment, the socket driver can be installed over the screw nut and bolt assembly in such a manner that the socket driver can be detached from the screw nut and bolt assembly. In an embodiment, a hardware stack-up comprising one or more of a nut, bolt, and a washer can be inserted through the one or more holes in the first base of the leveling foot tool.

Figure 1:
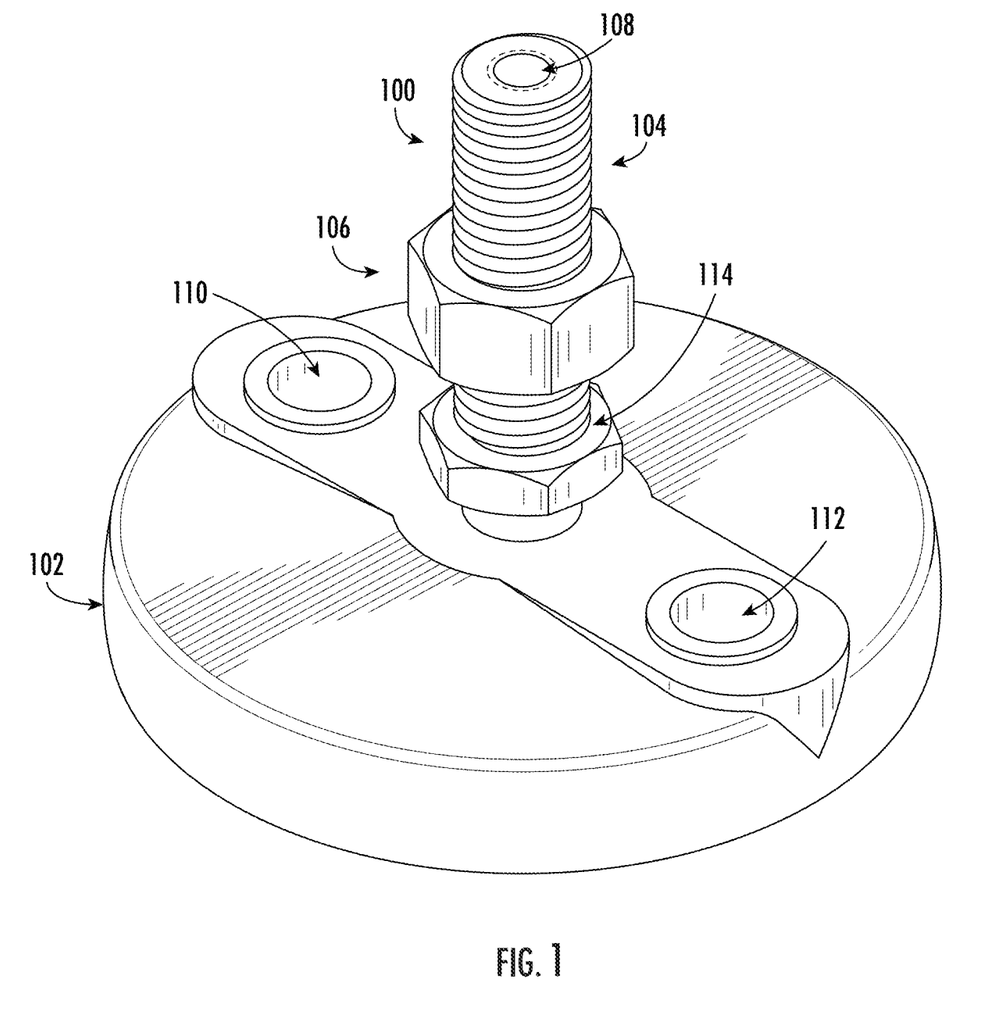
FIG. 1 illustrates an exemplary perspective view of a leveling foot tool, according to one or more embodiments described herein.

FIG. 1 illustrates an exemplary perspective view of a leveling foot tool 100 according to one or more embodiments described herein. The leveling foot tool 100 can comprise a first base 102 and a threaded rod 104. The first base 102 can comprise one or more holes such as 110 and 112. The threaded rod 104 can comprise a cavity 108 and one or more screw nuts such as 106 and 114. The threaded rod 104 can be threaded into a cavity in the first base 102 of the leveling foot tool 100.

In some embodiments, the first base 102 of the leveling foot tool 100 can be formed from one of a metal, rubber, and plastic. In some embodiments, the threaded rod 104 can be removably attached to the first base 102 of the leveling foot tool 100 using a ball end with a spherical cutout in the leg of the conveyor. In other embodiments, a magnetic coupling or any other form of attachment can be used. In yet some other embodiments, the first base 102 can be formed from a resilient material, for example polyamide, such that the threaded rod 104 can be press-fitted into the first base 102. In some embodiments, the threaded rod 104 can be molded to the first base 102 of the leveling foot tool 100. The threaded rod 104 can be injection-molded to the first base 102 of the leveling foot tool 100 to eliminate the need for conventional screws and bolts. In other embodiments, the threaded rod 104 can be welded to the first base 102 of the leveling foot tool 100.

In some embodiments, height of the leveling foot tool 100 can be adjusted using support members comprising two or more telescopic members.

Figure 2:
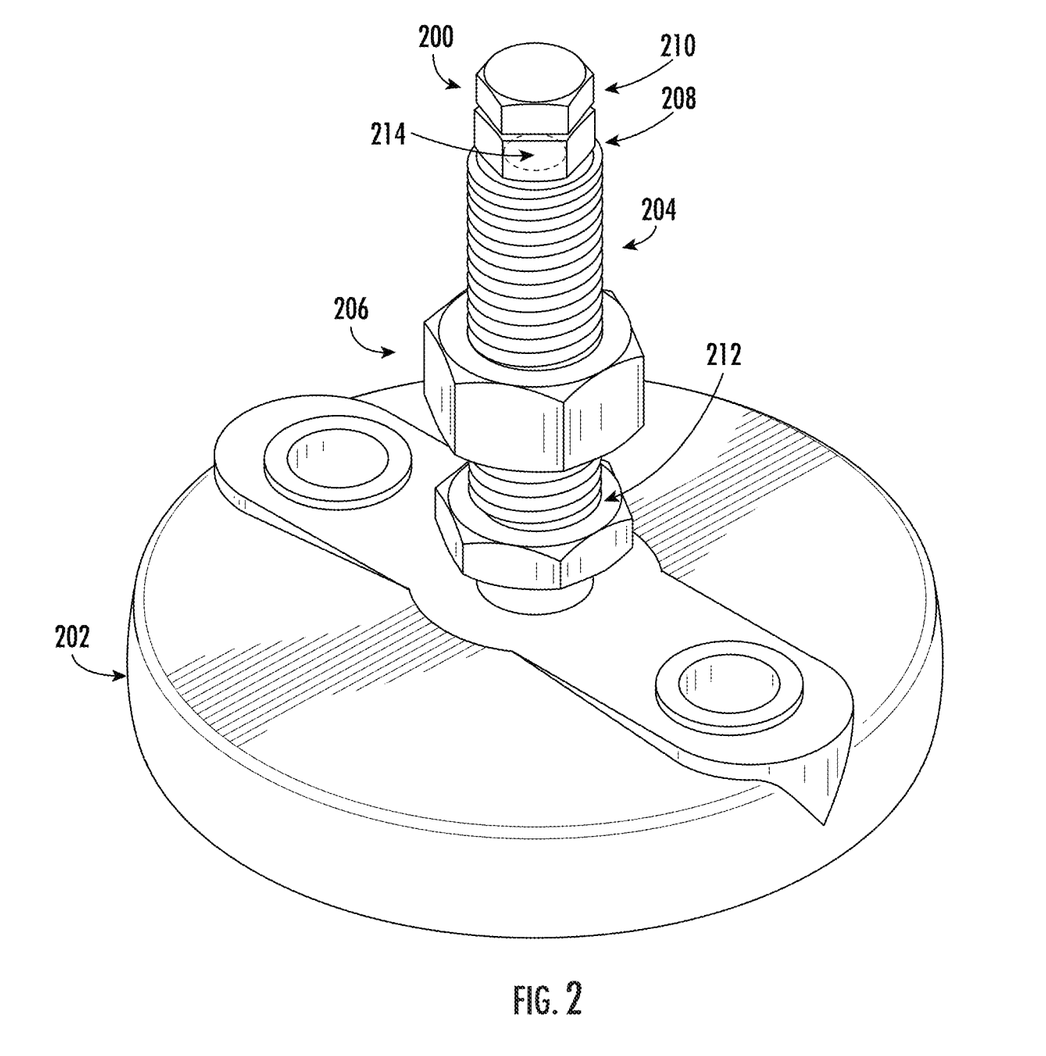
FIG. 2 illustrates an exemplary perspective view of the leveling foot tool with a screw nut and bolt assembly, according to one or more embodiments described herein.

FIG. 2 illustrates an exemplary perspective view of the leveling foot tool 200 with a screw nut and bolt assembly according to one or more embodiments described herein. The leveling foot tool 200 can comprise a first base 202 and a threaded rod 204. The threaded rod 204 can further comprise one or more screw nuts such as 206 and 212. The threaded rod 204 can comprise a cavity 214. A screw nut and bolt assembly comprising a screw bolt 210 and a screw nut 208 can be inserted into the cavity 214 of the threaded rod 204. In some embodiments, the screw bolt 210 and the screw nut 208 can be held together using a permanent thread locker. In other embodiments, a washer can be placed over the cavity 214 to hold the screw nut and bolt assembly comprising a screw bolt 210 and a screw nut 208 in place over the cavity 214. In some embodiments, the screw nut and bolt assembly can be inserted into the cavity 214 using an adhesive.

Figure 3:
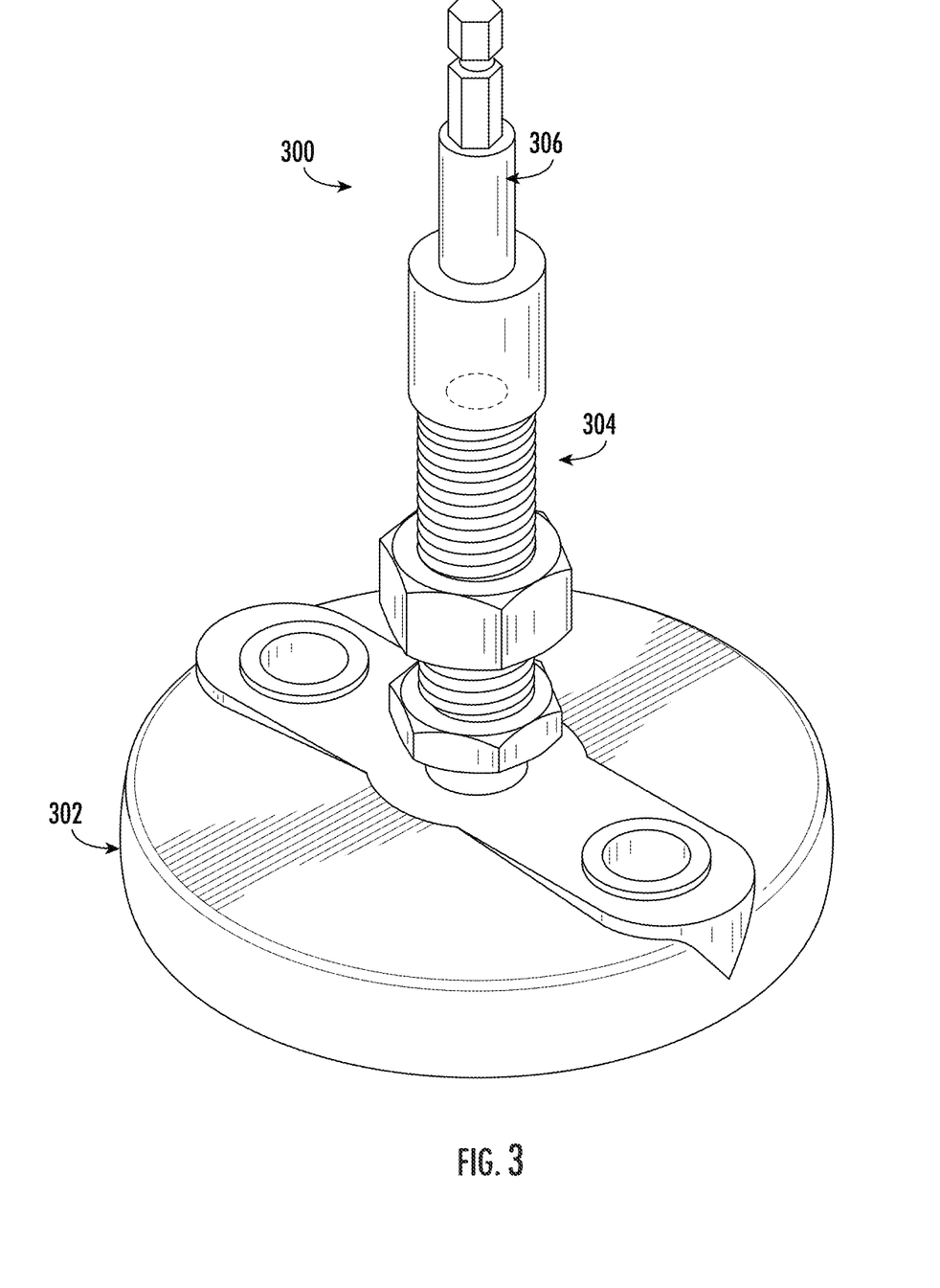
FIG. 3 illustrates an exemplary perspective view of the leveling foot tool with a socket driver installed over the screw nut and bolt assembly, according to one or more embodiments described herein.

FIG. 3 illustrates an exemplary perspective view of an embodiment of the leveling foot tool 300 with the threaded rod 304 and a socket driver 306 installed over the threaded rod 304, according to one or more embodiments described herein. The leveling foot tool 300 can comprise a first base 302 and the threaded rod 304. The socket driver 306 can be installed over the threaded rod 304 using one or more of a permanent thread locker, an industrial adhesive, and an epoxy. In some embodiments, the socket driver 306 can be contained in a housing.

Figure 4:
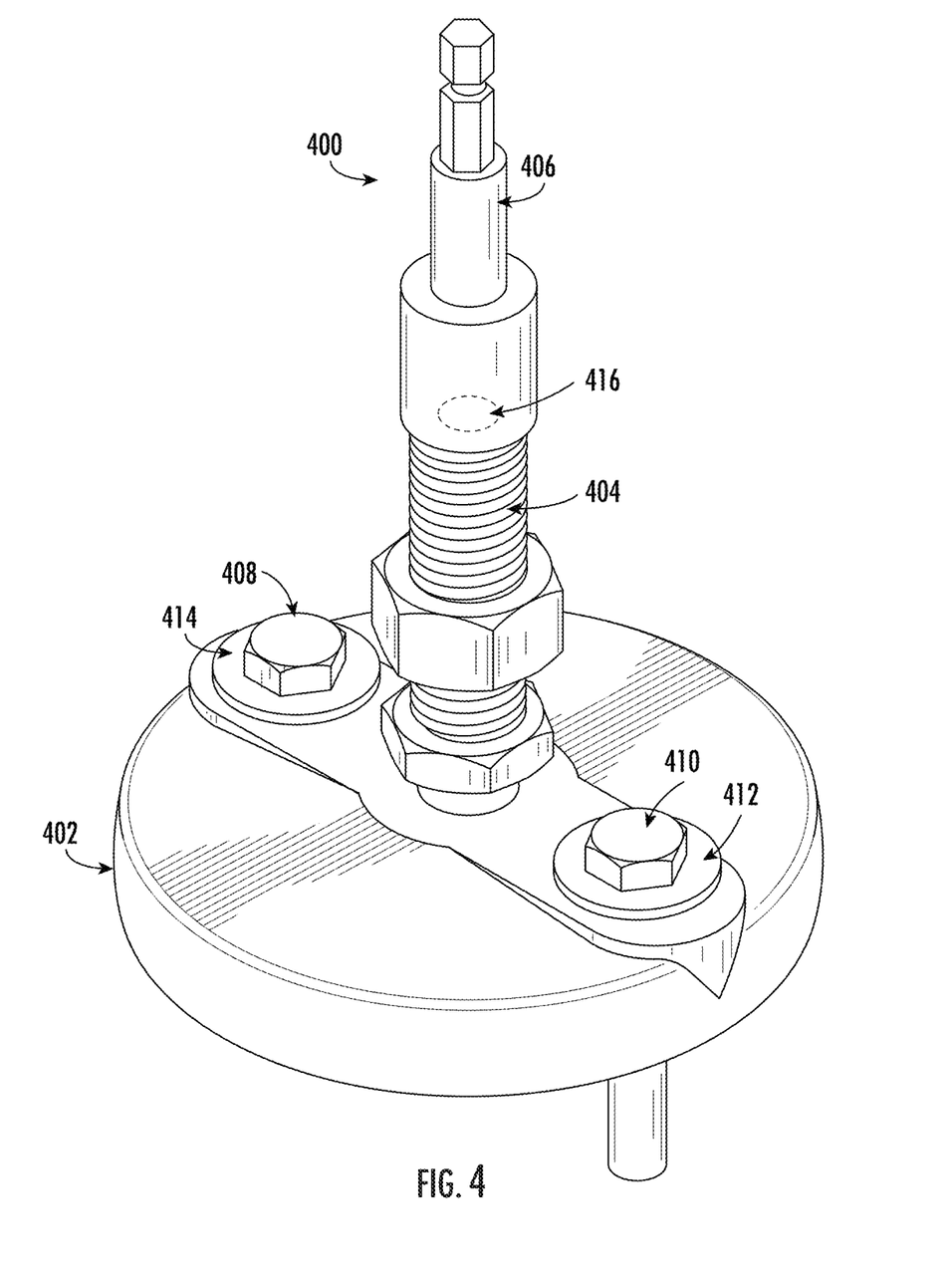
FIG. 4 illustrates an exemplary perspective view of the leveling foot tool with one or more screw nut and bolt assemblies attached to a first base of the leveling foot tool, according to one or more embodiments described herein.

FIG. 4 illustrates an exemplary perspective view of the leveling foot tool 400 with one or more screw nut and bolt assemblies such as 408 and 410 attached to a first base 402 of the leveling foot tool 400, according to one or more embodiments described herein. The leveling foot tool 400 can comprise the first base 402 and the threaded rod 404. The threaded rod 404 can comprise a cavity 416. A screw nut and bolt assembly can be threaded into the cavity 416. In some embodiments, other types of fasteners can also be used. A socket driver 406 can be installed over the screw nut and bolt assembly. The first base 402 of the leveling foot tool 400 can further comprise one or more holes (illustrated in FIG. 1) through which one or more screw nut and bolt assemblies such as 408 and 410 can be inserted. In other embodiments, flat washers such as 414 and 412 can be placed over the one or more holes to hold the screw nut and bolt assemblies 408 and 410 in place.

Figure 5:
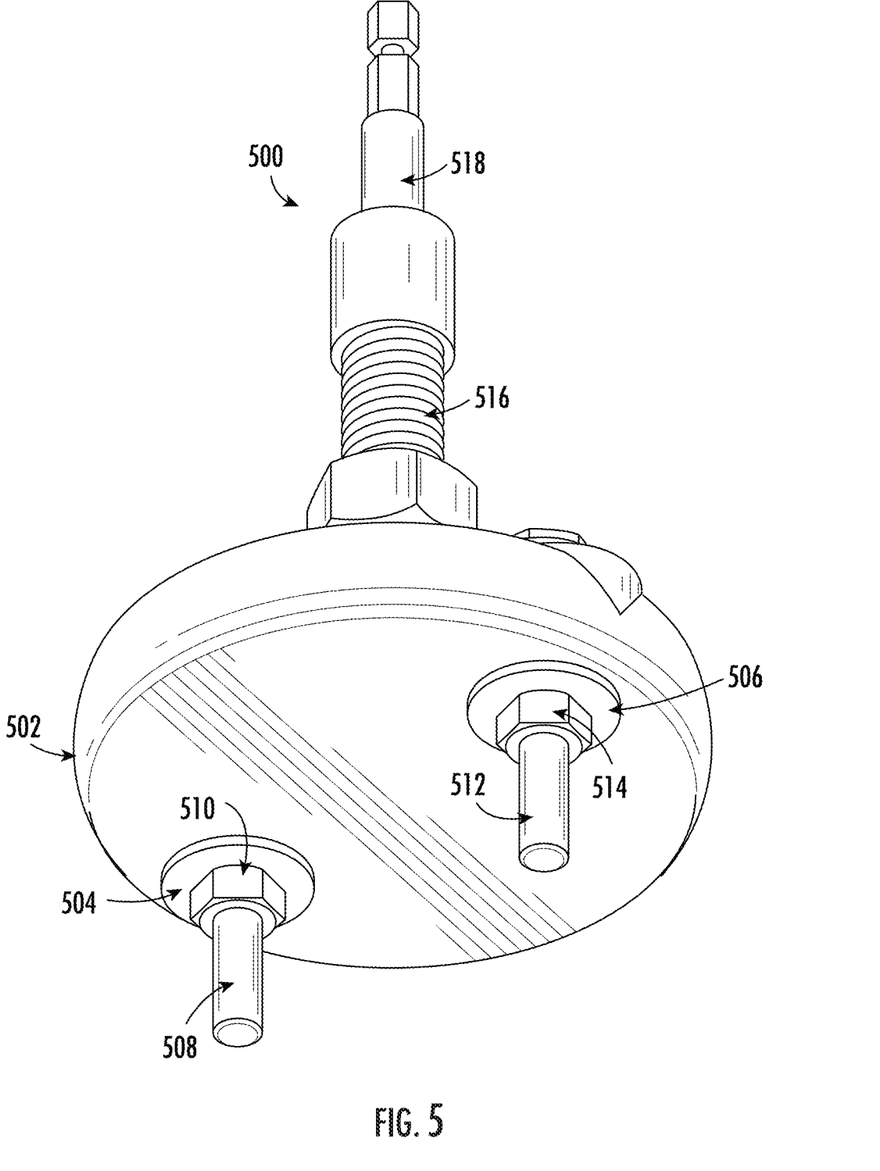
FIG. 5 illustrates an exemplary perspective view of the first base of the leveling foot tool, according to one or more embodiments described herein.

FIG. 5 illustrates an exemplary perspective view of the first base 502 of the leveling foot tool 500, in accordance with various aspects and embodiments of the subject disclosure. The leveling foot tool 500 can comprise the first base 502 and a threaded rod 516. The threaded rod 516 can further comprise a socket driver 518 that can be installed over the threaded rod 516 using one or more of a permanent thread locker, an industrial adhesive, and an epoxy. The first base 502 of the leveling foot tool 500 can comprise one or more holes through which one or more screw nut and bolt assemblies such as 508 and 512 can be inserted. The leveling foot tool 500 can then mounted on a drill using a drill chuck.

A leveling foot, which is to be installed into a threaded hole in a lower end of a leg of a machine, can comprise a threaded rod and a second base. The second base of the leveling foot can further comprise one or more holes to receive the one or more screw nut and bolt assemblies such as 508 and 512 of the leveling foot tool 500. Using the one or more screw nut and bolt assemblies such as 508 and 512, the first base 502 of the leveling foot tool 500 and the second base of the leveling foot can be attached to each other. The drill on which the leveling foot tool 500 has been mounted can then be used to generate a rotational motion in the first base 502 of the leveling foot tool 500. The rotational motion in the first base 502 can then configure the second base of the leveling foot to rotate. The drill can further generate a translational motion causing the second base and the threaded rod of the leveling foot to be driven into the threaded hole in the lower end of the leg of the machine. When the leveling foot has been installed in the leg of the machine, the first base 502 of the leveling foot 500 can be detached from the second base of the leveling foot to disengage the leveling foot tool 500.

In some embodiments, the one or more screw nut and bolt assemblies 508 and 512 can be held in place using one or more screw nuts such as 510 and 514 respectively on the lower face of the first base 502. In other embodiments, flat washers such as 504 and 506 can be used to hold the one or more screw nut and bolt assemblies 508 and 512 in place.

In some embodiments, height of the leveling foot tool 500 can be adjusted using a drill chuck. The drill chuck can be installed over the socket driver 518 such that an operator can determine the height of the leveling foot tool 500 using the drill chuck. In other embodiments, one or more spacer rings can be inserted between the first base 502 and the threaded rod 516 to adjust the height of the leveling foot tool 500 by stacking the one or more spacer rings.

Figure 6:
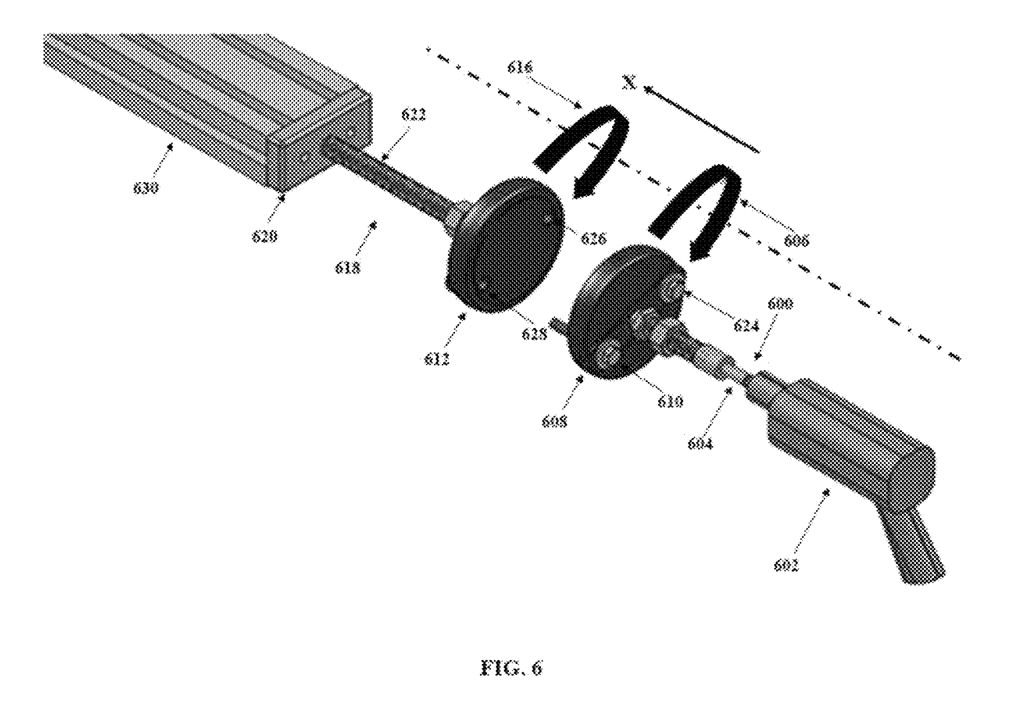
FIG. 6 illustrates an exemplary perspective view of the leveling foot tool driving a leveling foot into a leg of an extrusion machine.

FIG. 6 illustrates an exemplary perspective view of a leveling foot tool 600 driving a leveling foot 618 into a leg 630 of an extrusion machine. The leveling foot tool 600 can comprise a socket driver 604 and a first base plate 608. The first base plate 608 of the leveling foot tool 600 can further comprise one or more holes through which one or more screw nuts such as 610 and 624 can be inserted. The leveling foot tool 600 can be mounted on a drill 602 using a drill chuck.

The leveling foot 618 can be a conventional leveling foot having an approximate length of 6 inches. Those skilled in the art will recognize that length of the leveling foot 618 can be adjusted as desired. Further, the leveling foot 618 can comprise a threaded rod 622 and a second base plate 612. The threaded rod 622 of the leveling foot 618 can comprise a hex nut and a ball disposed on the lower end thereof. The ball can be adapted to fit into a cavity in the second base plate 612 of the leveling foot 618. The second base plate 612 of the leveling foot 618 can comprise one or more holes such as 626 and 628 to engage with the one or more screw nuts 610 and 624 of the leveling foot tool 600. In some embodiments, the second base plate 612 of the leveling foot 618 can be made using steel, plastic or other adequate material.

The leg 630 of the extrusion machine can comprise a foot plate 620. The foot plate 620 can further comprise a threaded hole in a central position of the foot plate 620. The threaded rod 622 of the leveling foot 618 can be driven into the threaded hole to install the leveling foot 618 into the leg 630 of the extrusion machine.

The first base plate 608 of the leveling foot tool 600 can then be configured to rotate in a clockwise or anti-clockwise direction using the drill 602 (indicated by the arrow 606 in FIG. 6). The first base plate 608 of the leveling foot tool 600 can then rotate the second base plate 612 of the leveling foot 618, which is attached to the first base plate 608 of the leveling foot tool 600, in a clockwise or anti-clockwise direction (indicated by the arrow 616 in FIG. 6).

The rotational motion of the second base plate 612 of the leveling foot 618 can rotate the threaded rod 622 which results in the leveling foot 618 being driven into the foot plate 620 in the X direction. This process can be repeated till leveling feet have been installed in all legs of the extrusion machine.

The leveling foot tool 600 mounted on the drill 602 can then be removed from the installed leveling foot 618, by disconnecting the first base plate 608 of the leveling foot tool 600 and the second base plate 612 of the leveling foot 618. To disconnect the first base plate 608 of the leveling foot tool 600 and the second base plate 612 of the leveling foot 618, the one or more screw nuts 610 and 624 of the leveling foot tool 600 can be disengaged from the one or more holes 626 and 628 of the second base plate 612 of the leveling foot 618.

In some embodiments, the drill 602 can be detached from the leveling foot tool 600 by loosening the drill chuck and removing the leveling foot tool 600.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A leveling foot tool comprising:
    a first base that engages a second base of a leveling foot;
    a threaded rod comprising a cavity, wherein the threaded rod is rotatable with respect to the first base, and wherein an end of the threaded rod is configured to be received by the first base;
    a screw nut and bolt assembly that is configured to be threaded into the cavity; and
    a socket driver that is configured to be installed over the screw nut and bolt assembly, wherein the first base of the leveling foot is rotated in response to the socket driver being rotated by a drill and the second base of the leveling foot is rotated by the first base thereby; driving the leveling foot into a leg of a conveyor system.

2. The leveling foot tool of claim 1, wherein the first base comprises a first set of one or more holes, and wherein one or more screw nuts are inserted through the first set of one or more holes in the first base, wherein the one or more screw nuts engage with a second set of one or more holes in the second base of the leveling foot.

3. The leveling foot tool of claim 2, wherein the one or more screw nuts which are inserted through the first set of one or more holes in the first base further comprise one or more flat washers.

4. The leveling foot tool of claim 1, wherein the screw nut and bolt assembly comprises a hex nut and a hex bolt.

5. The leveling foot tool of claim 4, wherein the hex nut is attached to the hex bolt using a permanent thread locker.

6. The leveling foot tool of claim 4, wherein the hex nut is attached to the hex bolt using an adhesive.

7. The leveling foot tool of claim 1, wherein the screw nut and bolt assembly is further configured to be attached to the cavity of the threaded rod using a permanent thread locker.

8. The leveling foot tool of claim 1, wherein the screw nut and bolt assembly is further configured to be attached to the cavity of the threaded rod using an adhesive.

9. The leveling foot tool of claim 1, wherein the socket driver is configured to be installed over the screw nut and bolt assembly using an adhesive.

10. The leveling foot tool of claim 1, wherein the socket driver is configured to be attached with a drill chuck.

11. A device for driving a leveling foot, the device comprising:
    a drill chuck, wherein the drill chuck is part of a drill;
    a first base that engages a second base of the leveling foot;
    a threaded rod comprising a cavity, wherein the threaded rod is rotatable relative to the first base, and wherein an end of the threaded rod is configured to be received by the first base;
    a screw nut and bolt assembly that is configured to be threaded into the cavity; and
    a socket driver that is configured to be installed over the screw nut and bolt assembly, wherein in response to the socket driver being rotated by the drill, the first base rotates the second base of the leveling foot, driving the leveling foot into a leg of a conveyor system.

12. The device of claim 11, wherein the socket driver is further configured to be coupled to the drill chuck and to rotate about a central axis to rotate the drill chuck.

13. The device of claim 11, wherein the leveling foot is configured to be disengaged from the device when the leveling foot is driven into the leg of the conveyor system.

14. The device of claim 11, wherein the first base comprises a first set of one or more holes, and wherein one or more screw nuts are inserted through the first set of one or more holes in the first base, wherein the one or more screw nuts engage with a second set of one or more holes in the second base of the leveling foot.

15. The device of claim 11, wherein the screw nut and bolt assembly comprises a hex nut and a hex bolt.

16. The device of claim 15, wherein the hex nut is attached to the hex bolt using a permanent thread locker.

17. The device of claim 15, wherein the hex nut is attached to the hex bolt using an adhesive.

18. The device of claim 11, wherein the screw nut and bolt assembly is further configured to be attached to the cavity of the threaded rod using a permanent thread locker.

19. The device of claim 11, wherein the screw nut and bolt assembly is further configured to be attached to the cavity of the threaded rod using an adhesive.

20. The device of claim 11, wherein the socket driver is configured to be installed over the screw nut and bolt assembly using an adhesive.

\* \* \* \* \*